United States Patent
Deng et al.

(10) Patent No.: US 12,118,592 B2
(45) Date of Patent: Oct. 15, 2024

(54) SPONTANEOUS EDGE APPLICATION DEPLOYMENT AND PRICING METHOD BASED ON INCENTIVE MECHANISM

(71) Applicant: ZHEJIANG UNIVERSITY, Hangzhou (CN)

(72) Inventors: Shuiguang Deng, Hangzhou (CN); Yishan Chen, Hangzhou (CN); Ying Li, Hangzhou (CN); Jianwei Yin, Hangzhou (CN); Zhaohui Wu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 318 days.

(21) Appl. No.: 17/435,371

(22) PCT Filed: Jul. 30, 2020

(86) PCT No.: PCT/CN2020/105855
§ 371 (c)(1),
(2) Date: Aug. 31, 2021

(87) PCT Pub. No.: WO2021/128849
PCT Pub. Date: Jul. 1, 2021

(65) Prior Publication Data
US 2022/0156809 A1  May 19, 2022

(30) Foreign Application Priority Data
Dec. 25, 2019  (CN) .......................... 201911360629.6

(51) Int. Cl.
*G06Q 30/0283* (2023.01)
*G06F 8/60* (2018.01)

(52) U.S. Cl.
CPC ........... *G06Q 30/0283* (2013.01); *G06F 8/60* (2013.01)

(58) Field of Classification Search
None
See application file for complete search history.

(56) References Cited

U.S. PATENT DOCUMENTS

2020/0314174 A1 * 10/2020 Dailianas ............ G06F 9/45558

FOREIGN PATENT DOCUMENTS

| CN | 109039954 A | * 12/2018 | ............. H04L 47/70 |
| CN | 110113761 A |   8/2019 | |

(Continued)

OTHER PUBLICATIONS

Wen Sun, "Double Auction-Based Resource Allocation for Mobile Edge Computing in Industrial Internet of Things", Jul. 13, 2018, IEEE, vol. 14, pp. 4692-4701 (Year: 2018).*

(Continued)

*Primary Examiner* — Jeff Zimmerman
*Assistant Examiner* — Jorge G Del Toro-Ortega
(74) *Attorney, Agent, or Firm* — Jiwen Chen; Joywin IP Law PLLC

(57) ABSTRACT

Disclosed in the present invention is a spontaneous edge application deployment and pricing method based on an incentive mechanism. The method comprises the following steps: building an edge end application oriented spontaneous deployment system architecture; then proposing an incentive mechanism aiming at spontaneous edge application deployment and prizing; solving the spontaneous edge application deployment and prizing problem based on a backward induction method, thereby obtaining an optimal deployment solution of an edge server and an optimal prizing strategy of an application provider.

1 Claim, 5 Drawing Sheets

(56) References Cited

FOREIGN PATENT DOCUMENTS

| CN | 110247793 A | 9/2019 |
| CN | 110544147 A | 12/2019 |
| WO | WO2019237363 A | 12/2019 |

OTHER PUBLICATIONS

Ke Zhang et al., "Mining Task Offloading in Mobile Edge Computing Empowered Blockchain", Nov. 14, 2019, IEEE, pp. 234-239 (Year: 2019).*
Amit Samanta et al., "Adaptive Service Offloading for Revenue Maximization in Mobile Edge Computing With Delay-Constraint", Oct. 1, 2019, IEEE, vol. 6, pp. 3864-3872 (Year: 2019).*
Quyuan Wang et al. "Profit Maximization Incentive Mechanism for Resource Providers in Mobile Edge Computing", Jun. 24, 2019, IEEE, vol. 15, pp. 138-149 (Year: 2019).*

* cited by examiner

SPONTANEOUS EDGE APPLICATION DEPLOYMENT AND PRICING METHOD BASED ON INCENTIVE MECHANISM

This is a U.S. national stage application of PCT Application No. PCT/CN2020/105855 under 35 U.S.C. 371, filed Jul. 30, 2020 in Chinese, claiming priority to Chinese Patent Applications No. 201911360629.6, filed Dec. 25, 2019, all of which are hereby incorporated by reference.

FIELD OF TECHNOLOGY

The present invention relates to a spontaneous deployment and pricing problem of an application in an edge environment, and particularly relates to a spontaneous edge application deployment and pricing method based on an incentive mechanism.

BACKGROUND

The rapid development of mobile edge computing (MEC) provides a shared and low-delay computing environment for application deployment, and the application requested by a terminal is deployed and executed in a peripheral edge server, which can greatly improve the user experience in the interaction process of the terminal and the server. At present, mobile edge application deployment research work is carried out under the condition that the edge server passively becomes a deployment side, and at the moment, the edge server may not be willing to become the deployment side because a large amount of resource space and computing power consumption are needed for data storage and service execution, and the edge server without considering the incentive rewards may very likely submit an incorrect result, and postpones the deployment process at will.

Therefore, a spontaneous edge working network considering the incentive rewards is a good choice.

In a spontaneous edge application deployment system, an application (data and services) provided by an application provider has great value, and deploying and operating the application can bring added value to the edge server. Firstly, the application provider proposes auction to the edge server for existing application resources, and the edge server gives deployment willingness of the resources according to conditions of self memory space, clock frequency, etc. Secondly, the application provider and the edge server dynamically adjust the auction price and the deployment intention value separately on the basis of their profits. Finally, when their profits both reach the maximum value, an optimal deployment solution and a pricing strategy can be obtained. The profit of the application provider comes from the edge server, the edge server needs to pay this expense to the application provider in order to obtain the deployment right and the operation right of the application and then obtains rewards from the user side by means of the operation of the obtained application, and meanwhile, the edge server also needs to consume a certain cost overhead (content overhead, energy consumption, etc.) during the operation.

However, the application deployment system for the spontaneous edge working network also faces some challenges. One of the main challenges is the problem about resource allocation across multiple edge servers, and thus, how to allocate appropriate resources for each mobile application needs to be considered. Mobile applications contain a set of service components and require a set of edge servers to accommodate them. When accommodating the service components, we should consider not only the load balancing problem between the edge servers, but also the cost of consumption. Furthermore, the response time for application deployment and execution should be as low as possible, which is critical to the user experience. However, most apparatus in edge computing are heterogeneous computing platforms, runtime environments, system data on each apparatus are different, computing resources of edge apparatuses are relatively limited, and therefore it is difficult to perform high-quality mobile application deployment work in an edge computing scene. In addition, designing an incentive mechanism to encourage the edge server to complete the deployment task and meanwhile making the profits obtained by the edge server and the application provider reach the highest on the premise of low delay are practical and challenging.

SUMMARY OF THE INVENTION

As for a spontaneous application deployment and pricing problem in an edge network environment, the present invention provides an application deployment and pricing method based on an incentive mechanism.

The present invention is achieved by using the following solution:

A spontaneous edge application deployment and pricing method based on an incentive mechanism includes the following steps:

1) building an edge application oriented spontaneous deployment system architecture;
2) proposing an incentive mechanism aiming at spontaneous edge application deployment and prizing; and
3) obtaining the spontaneous edge application deployment and prizing method.

In the technical solution, further, the edge application oriented spontaneous deployment system architecture in step 1) includes three portions of:

(1) deployment monitoring, wherein the deployment monitoring is used for collecting real-time information from a user application deployment request;
(2) deployment planning, wherein a core of a deployment system is calculated and is used for planning a spontaneous edge application deployment and prizing method according to related given information; and
(3) a deployment engine, wherein current application deployment operation is executed according to the obtained spontaneous deployment and prizing strategy.

Further, the incentive mechanism aiming at spontaneous edge application deployment and prizing in step 2) is defined as follows:

capacity proportion of each edge server to obtain deployment right is defined as $$\beta_i(x_m^i, x_{-m}^i) = \frac{x_m^i}{\sum_{k \in M} x_k^i},$$

wherein:

(1) $x_m^i$ is a deployment willingness of an edge server m to service i, and $x_{-m}^i$ is a deployment willingness matrix of all edge servers except the edge server m; and
(2) the deployment willingness $x_m^i$ in is related to an intention value of a current round of deployment right competition, and processing capacity and a memory space of the edge server m, which is as follows:

$$x_m^i = \gamma_m^i(\xi u_m^i + \varepsilon f_m) \tag{1}$$

wherein ξ and ε represent weighting parameters, the value thereof is 0-1, $u_m^i$ is a memory space left when the edge server m deploys service i, $f_m$ represents a clock frequency of the edge server m, and $\gamma_m^i$ represents a given intention value, aiming a charge of an application provider, of deployment right competition when the edge server m deploys service i.

Furthermore, an objective function of the spontaneous edge application deployment and prizing method in step 3) is:

profit $U_A^i$ obtained by the application provider in each round of service deployment:

$$U_A^i = \max_{p_m} \sum_{m \in M} p_m^i x_m^i \quad (2)$$

wherein, 1) the profit $U_A^i$ obtained by the application provider in each round of service deployment comes from expense needing to be paid to the provider by the edge server after winning the deployment right;

$p_m^i$ represents pricing proposed by the application provider to the edge server m obtaining the deployment right in the ith round of deployment right competition;

profit $U_S^i$ obtained by the edge server in each round of service deployment:

$$U_S^i = \max_{x_m, i \in N, n \in M} \left\{ (R + rs_i) \frac{x_m^i}{\sum_{k \in M} x_k^i} QoS - p_m^i x_m^i - c_m^i \right\} \quad (3)$$

2) the profit $U_S^i$ obtained by the edge server in each round of service deployment consists of reward available for the server after winning the deployment right, expense paid to the application provider by the server and spending of service operation of the server;

R represents fixed reward earning available for the edge server after succeeding in obtaining the deployment right; $rs_i$ represents part of variable award value; r is a given variable award factor; $s_i$ is a memory size of an ith service; and $c_m^i$ is source energy consumption cost of the edge server m when deploying and operating service i, a value thereof is related to a unit memory cost of the server and a unit calculation cost of a CPU, and a calculation equation thereof is as follows:

$$c_m^i = a_m s_i + b_m o_{s_i} \quad (4)$$

$$b_m = \psi f_m \quad (5)$$

wherein $a_m$ represents the unit memory cost of the edge server m; $b_m$ represents the unit calculation cost of a CPU of the edge server m and is relates to a clock frequency of the server, and ψ is a weighting coefficient; and $o_{s_i}$ represents a clock number consumed by operating service i;

QoS, a quality of service, is a function related to service transmission time and execution time, the lower the quality of service is, the lower the reward obtained by the edge server is, the calculation is as follows:

$$QoS = f(b_{m_{tran}}^i, b_{m_{exec}}^i) \quad (6)$$

wherein, $b_{m_{tran}}^i$ is a transmission time of data needed by edge server m before deploying service i; $b_{m_{exec}}^i$ is an executed time of service i on the edge server m; and f is a function for normalization processing of $b_{m_{tran}}^i$ and $b_{m_{exec}}^i$.

The present invention further provides a process for application deployment and pricing by using the method, which is as follows:

1) request stage, wherein a deployment request of any application from a user is received by the application provider;
2) competitive stage, wherein the edge server is made to compete for the deployment right of each service of the required application, and a Nash equilibrium between the service pricing and a deployment intention value of the edge server are found on the basis of a Stackelberg game model;
3) deployment stage, wherein the service is deployed; and
4) repeating steps 2)-3) until after all services of the application are deployed.

The working principle of the present invention is:

Mainly for the spontaneous application deployment and pricing problem in the edge environment, the present invention designs a spontaneous application deployment system, on the premise of low-delay deployment, the highest profits of the application provider and the edge server in each round of service deployment are taken as a target, a Nash equilibrium of a Stackelberg game model is sought between the pricing provided by the application provider and the deployment intention value (an important factor influencing the deployment willingness) of the edge server, and then the spontaneous edge application deployment and pricing method based on the incentive mechanism is provided.

The Present Invention has the Beneficial Effects

The present invention provides a spontaneous edge application deployment and pricing method based on the incentive mechanism for the first time, and the method may respond to any application deployment request sent by a user and invoke all peripheral edge servers to compete for the deployment right. On the premise of low-delay deployment, the highest profits of the application provider and the edge server in each round of service deployment are taken as a target, a Nash equilibrium of a Stackelberg game model is sought between the pricing provided by the application provider and the deployment intention value (an important factor influencing the deployment willingness) of the edge server, and finally the optimal application deployment and pricing solution is obtained.

DESCRIPTION OF THE EMBODIMENTS

The present invention will be further elaborated hereafter in conjunction with accompanying drawings and the specific embodiments.

A spontaneous edge application deployment and pricing method based on an incentive mechanism includes the following steps:
1) building an edge application oriented spontaneous deployment system architecture;
2) proposing an incentive mechanism aiming at spontaneous edge application deployment and prizing; and
3) obtaining the spontaneous edge application deployment and prizing method.

Figure 1:
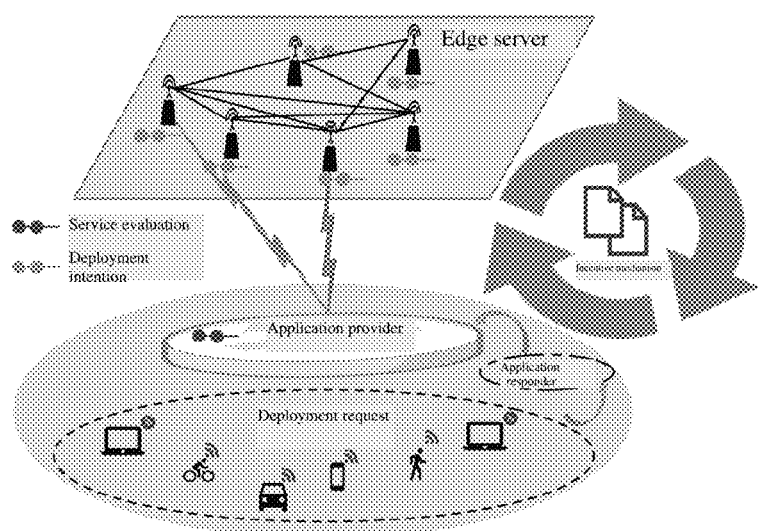
FIG. 1 is an edge application oriented spontaneous deployment system architecture.

As shown in FIG. 1, the edge application oriented spontaneous deployment system architecture in the present invention mainly includes three portions of:
(1) deployment monitoring, wherein the deployment monitoring is used for collecting real-time information from a user application deployment request;
(2) deployment planning, wherein a core of a deployment system is calculated and is used for planning a spontaneous edge application deployment and prizing method according to related given information; and
(3) a deployment engine, wherein current application deployment operation is executed according to the obtained spontaneous deployment and prizing strategy.

In a traditional edge application deployment system without any intermediary agent, the edge server may not be willing to become the deployment side because a large amount of resource space and computing power consumption are needed for data storage and service execution, and the edge server without considering the incentive rewards may submit an incorrect result in a great probability, and postpones the deployment process at will. For solving the problem, we provide an incentive mechanism aiming at spontaneous edge application deployment and prizing.

Capacity proportion of each edge server to obtain deployment right is defined as $$\beta_i(x_m^i, x_{-m}^i) = \frac{x_m^i}{\sum_{k \in M} x_k^i},$$

wherein:
(1) $x_m^i$ is a deployment willingness of an edge server m to service i, and $x_{-m}^i$ is a deployment willingness matrix of all edge servers except the edge server m; and
(2) the deployment willingness $x_m^i$ is related to an intention value of a current round of deployment right competition, and processing capacity and a memory space of the edge server m, which is as follows:

$$x_m^i = \gamma_m^i(\xi u_m^i + \varepsilon f_m) \tag{1}$$

wherein $\xi$ and $\varepsilon$ represent weighting parameters, the value thereof is 0-1, $u_m^i$ is a memory space left when the edge server m deploys service i, $f_m$ represents a clock frequency of edge server m, and $\gamma_m^i$ represents a given intention value, aiming a charge of an application provider, of deployment right competition when the edge server m deploys service i.

Figure 2:
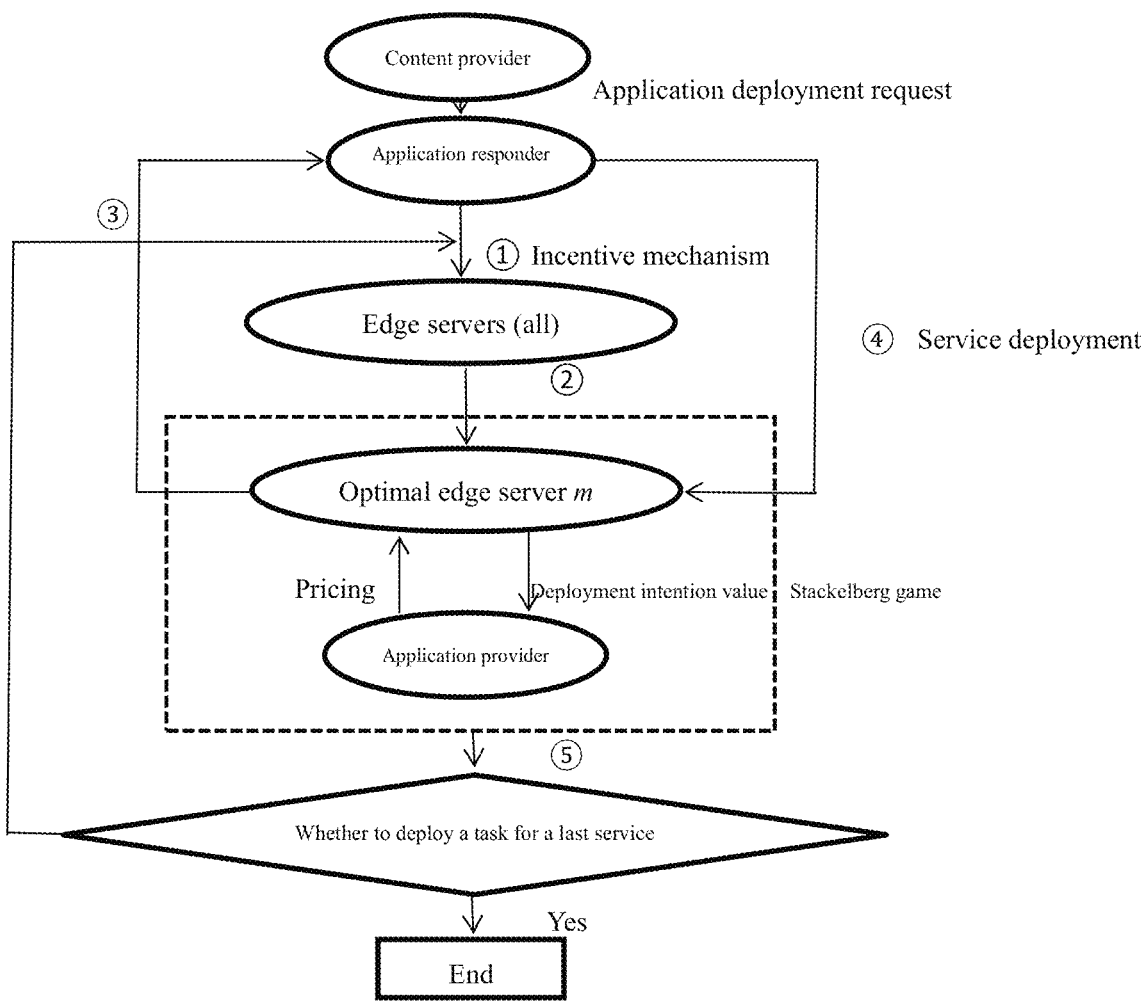
FIG. 2 is an incentive mechanism aiming at spontaneous edge application deployment and prizing.

FIG. 2 shows a flow schematic diagram of the spontaneous edge application deployment and pricing method. After the user sends an application deployment request, a responder analyses service and data elements in an application and input service information needing deployment into a work network in a digraph sequence, then all edge servers start to compete for the deployment right and the operation right of the service, and the winning capacity of the edge servers are measured according to their memory spaces, clock frequency and the deployment intention values. For making the mechanism effectively solve the spontaneous deployment problem of the application, the present invention introduces the Stackelberg game module with profit maximization on the basis of the mechanism. After the application deployment request generates, the application provider provides the edge server side with a bidding of each round of service deployment right, the edge server side decides this round of deployment unit willingness according to the provided bidding, and then a strategy space and a profit function of the two game sides are further constructed.

Profit $U_A^i$ obtained by the application provider in each round of service deployment:

$$U_A^i = \max_{p_m} \sum_{m \in M} p_m^i x_m^i \tag{2}$$

1) The profit $U_A^i$ obtained by the application provider in each round of service deployment comes from expense needing to be paid to the provider by the edge server after winning the deployment right.

$p_m^i$ represents pricing proposed by the application provider to the edge server m obtaining the deployment right in the ith round of deployment right competition;

profit $U^i{}_S$ obtained by the edge server in each round of service deployment:

$$U_S^i = \max_{x_m, i \in N, n \in M} \left\{ (R + rs_i) \frac{x_m^i}{\sum_{k \in M} x_k^i} QoS - p_m^i x_m^i - c_m^i \right\} \tag{3}$$

2) The profit $U^i{}_S$ obtained by the edge server in each round of service deployment consists of reward available for the server after winning the deployment right, expense paid to the edge service provider by the server and spending of service operation of the server.

R represents fixed reward earning available for the edge server after succeeding in obtaining the deployment right; $rs_i$ represents part of variable award value; r is a given variable award factor; $s_i$ is a memory size of an ith service; and $c^i{}_m$ is source energy consumption cost of the edge server m when deploying and operating service i, a value thereof is related to a unit memory cost of the server and a unit calculation cost of a CPU, and a calculation equation thereof is as follows:

$$c_m^i = a_m s_i + b_m o_{s_i} \tag{4}$$

$$b_m = \psi f_m \tag{5}$$

wherein $a_m$ represents the unit memory cost of the edge server m; $b_m$ represents the unit calculation cost of a CPU of the edge server m and is relates to a clock frequency of the server, and $\psi$ is a weighting coefficient; and $o_{si}$ represents a clock number consumed by operating service i.

$QoS$, a quality of service, is a function related to service transmission time and execution time, the lower the quality of service is, the lower the reward obtained by the edge server is, the calculation is as follows:

$$QoS = f(b_{m_{tran}}^i, b_{m_{exec}}^i) \tag{6}$$

wherein, $b_{m_{tran}}^i$ is a transmission time of data needed by edge server m before deploying service i; $b_{m_{exec}}^i$ is an executed time of service i on the edge server m; and f is a function for normalization processing of $b_{m_{tran}}{}^i$ an $b_{m_{exec}}{}^i$.

For the spontaneous edge application deployment problem, the present invention uses the Stackelberg game model to optimize the target. The spontaneous edge application deployment problem is mapped to a double-target model, after the deployment request generates, the application provider analyses the application into several service and data elements and provides the pricing $p_m{}^i$ needing to be paid by the edge server in each round of deployment right competition, and then the edge server determines the corresponding strategy space and obtains the capacity proportion of the deployment right available for the edge server in the competition process through a calculation equation (1), wherein the larger the capacity proportion is, the larger the probability obtaining the deployment right is. Finally, the strategy space and the profit function of the two game sides are further constructed. The incentive mechanism mainly includes four stages of:

1) Initialization

In the initialization stage, it is necessary to determine the application digraph needing to be deployed, the source energy consumption cost $c^i{}_m$ of the edge server m when deploying and operating service i, the variable award factor r and the fixed reward earning R.

2) Incentive Operation

By means of the incentive operation, the edge server actively competes for the deployment right of service for obtaining the profit. The capacity proportion of the edge server to obtain the deployment right is calculated according to the following equation:

$$\beta_i(x_m^i, x_{-m}^i) = \frac{x_m^i}{\sum_{k \in M} x_k^i} \quad (8)$$

3) Game Operation

On the basis of the provided equations (2) and (7), meanwhile considering the influence of the quality of service on the user experience during deployment, the equation (7) is subjected to secondary derivation, and it is certified that the equation satisfies strictly concave function features.

$$\frac{\partial U_s}{\partial x_m^i} = (R + rs_i) \frac{\partial \beta_m^i}{\partial x_m^i} QoS - p_m^i \quad (9)$$

$$\frac{\partial U_s}{\partial^2 x_m^i} = (R + rs_i) \frac{\partial^2 \beta_m^i}{\partial^2 x_m^i} QoS < 0 \quad (10)$$

Since $\frac{\partial^2 \beta_m^i}{\partial^2 x_m^i} = -2 \frac{\sum_{m \neq k} x_k^i}{(\sum_{k \in M} x_k^i)^2} < 0 \quad (11)$ Thus, it may be known from equations (9), (10) and (11) that a Nash equilibrium point exist in the game model.

After optimal $X^{*i}$ is solved, the equation (7) is subjected to derivation to obtain a maximum value, the optimal solution $P^{*i}$ is determined, the optimal price does have a closed mode, and the optimal price of a single service is closely linked to the prices of other services, that is, when the price of one service changes, other services also need to update the corresponding expense, and accordingly, the optimization process of the price need to be solved by means of an iteration manner.

4) Deployment Operation

The Nash equilibrium point is solved between the strategy space and the profit of the application provider and the edge server, and then the service may be deployed.

The process for application deployment and pricing by using the method of the present invention is as follows:
1) request stage, wherein a deployment request of any application from a user is received by the application provider;
2) competitive stage, wherein the edge server is made to compete for the deployment right of each service of the required application, and a Nash equilibrium between the service pricing and a deployment intention value of the edge server are found on the basis of a Stackelberg game model;
3) deployment stage, wherein the service is deployed; and
4) repeating steps 2)-3) until after all services of the application are deployed.

5) Simulation Result

Figure 3:
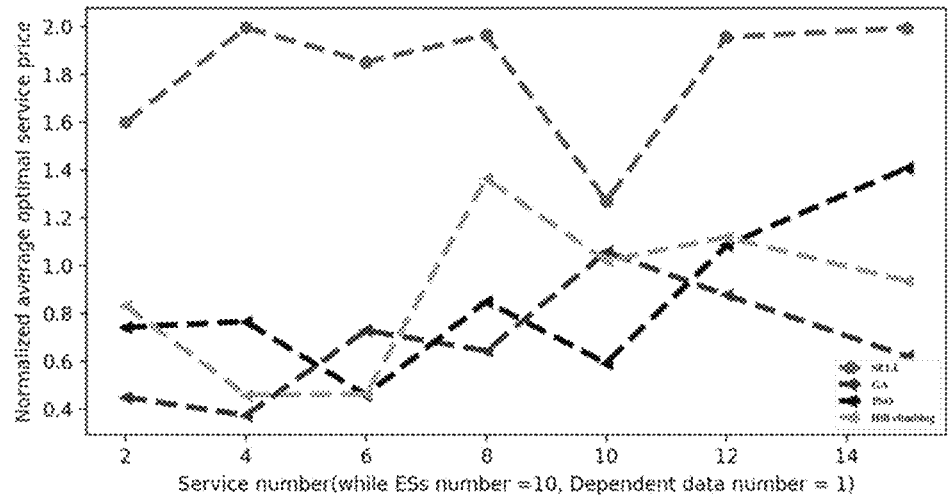
FIG. 3 is a relation between service average optimal price and a service number.
Figure 4:
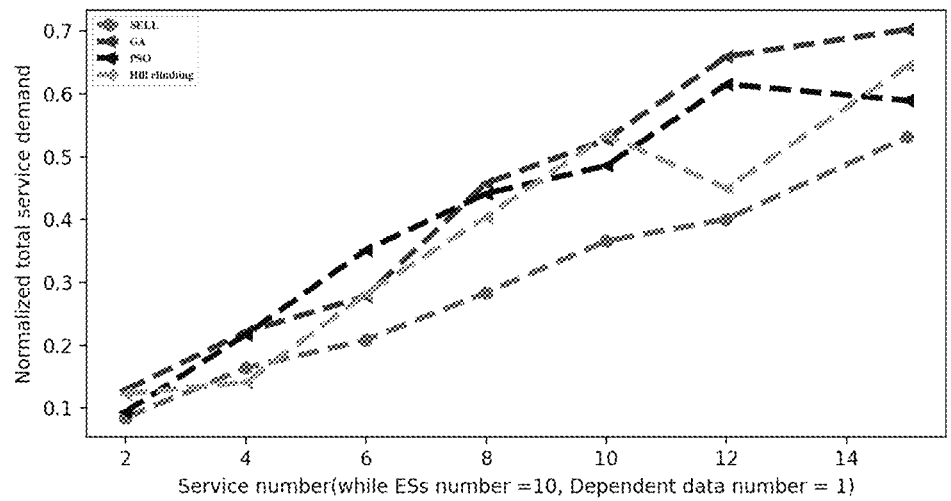
FIG. 4 is a relation between a deployment willingness total value of an edge server and the service number.
Figure 5:
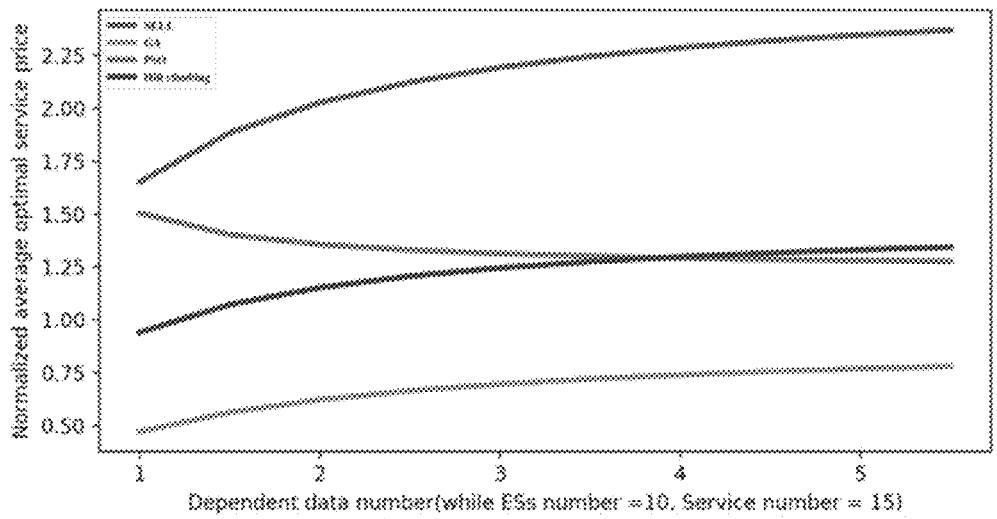
FIG. 5 is a relation between the service average optimal price and the dependent data number.
Figure 6:
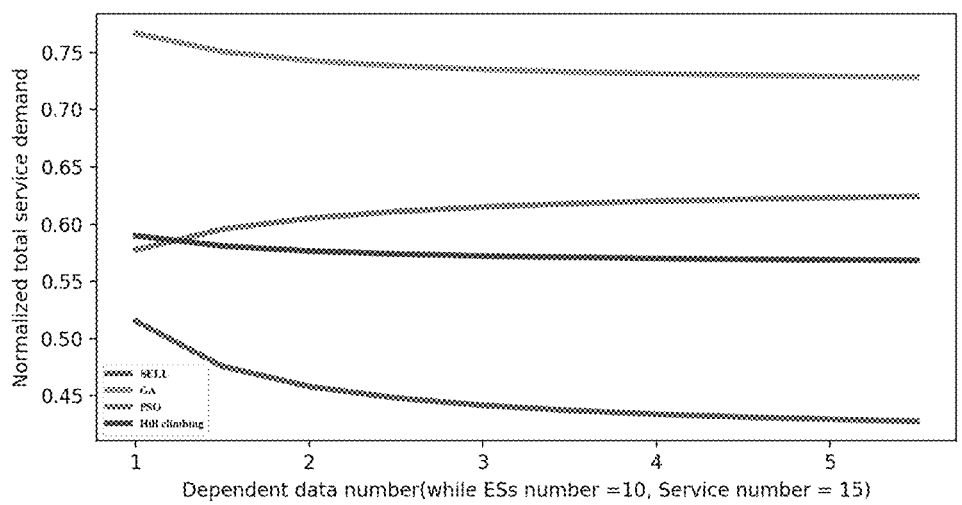
FIG. 6 is a relation between a deployment willingness total value of all edge servers and the dependent data number.
Figure 7:
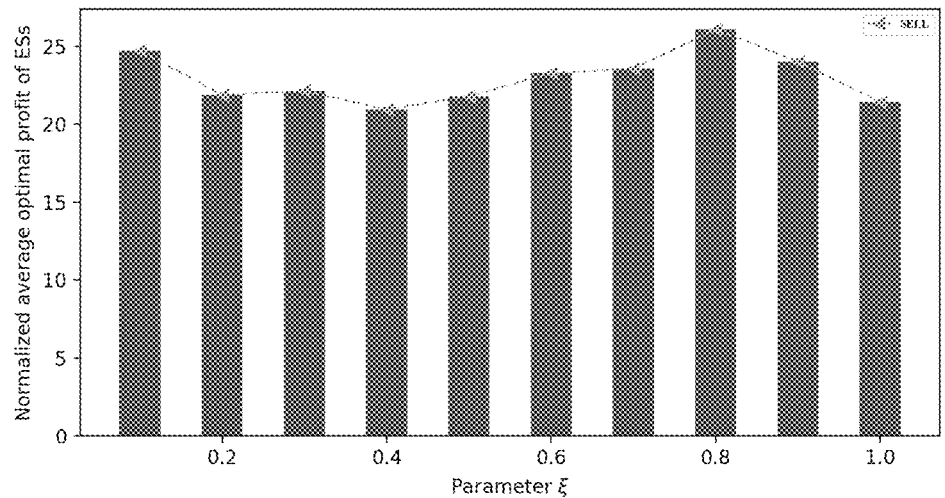
FIG. 7 is a relation between a profit average value of the edge server and a residue memory space in a single round of service deployment.
Figure 8:
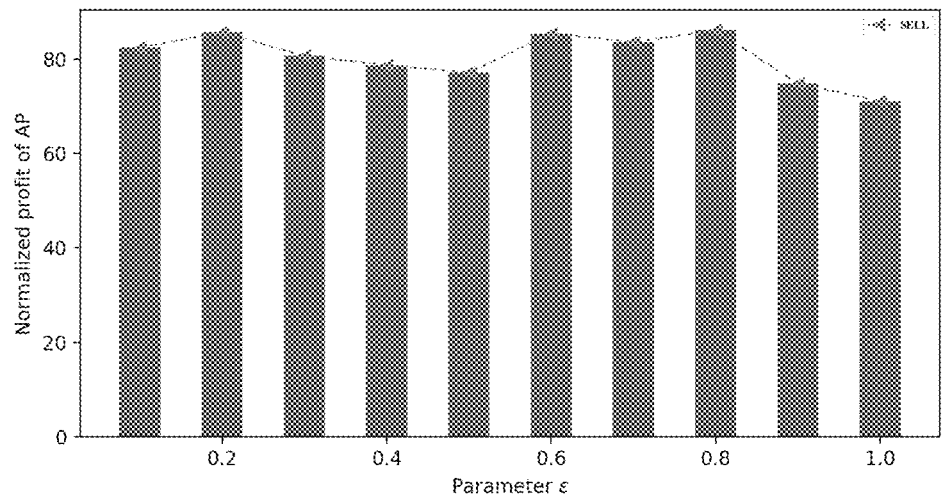
FIG. 8 is a relation between a total profit value of an application provider and the residue memory space.

Data results of the method (SELL) of the present invention and conventional methods (genetic algorithm GA, particle swarm optimization PSO, and Hill Climbing algorithm) are compared. Comparing FIGS. 3 and 4, it may be known that the method of the present invention may obtain an optimal deployment solution of the edge server and an optimal pricing strategy of the application provider, so as to make the application provider and the edge server obtain the highest profits under the condition of low delay. Comparing FIGS. 5 and 6, it may be known that along with the dependent data number changes, the effect of the method of the present invention is hardly influenced, and compared with the other three methods, the method more easily obtains the optimal deployment solution of the edge server and the optimal pricing strategy of the application provider, so as to make the application provider and the edge server obtain the highest profits under the condition of low delay. Comparing FIGS. 7 and 8, it is known that the change of the residue memory space in the edge server may influence the profits of the application provider and the edge server, and by means of comparison and analysis, the weighting parameter of the residue memory space is set to be 0.8.

The invention claimed is:

1. A computer-implemented spontaneous edge application deployment and pricing method based on an incentive mechanism, comprising the following steps:
1) building an edge application oriented spontaneous deployment system architecture;
2) proposing an incentive mechanism aiming at spontaneous edge application deployment and pricing; and
3) obtaining the spontaneous edge application deployment and pricing method;
wherein the edge application oriented spontaneous deployment system architecture in step 1) comprises three portions:
(a) deployment monitoring, wherein the deployment monitoring is used for collecting real-time information from a user application deployment request;
(b) deployment planning, wherein a core of a deployment system is calculated and is used for planning the spontaneous edge application deployment and pricing method according to related given information; and
(c) a deployment engine, wherein current application deployment operation is executed according to the obtained spontaneous deployment and pricing method;
wherein the incentive mechanism aiming at spontaneous edge application deployment and pricing in step 2) is defined as follows:

a ratio of capacity of each edge server to obtain deployment right is defined as $$\beta_i(x_m^i, x_{-m}^i) = \frac{x_m^i}{\sum_{k \in M} x_k^i},$$  (5)

wherein:
(1) $x_m^i$ is a deployment willingness of an edge server m to service i, and $x_{-m}^i$, is a deployment willingness matrix of all edge servers except the edge server m; and
(2) the deployment willingness $x_m^i$ is related to an intention value of a current round of deployment right competition, and processing capacity and a memory space of the edge server m, which is as follows:

$$x_m^i = \gamma_m^i(\xi u_{mi}^i + \varepsilon f_m)$$  (1)

wherein $\xi$ and $\varepsilon$ represent weighting parameters, $u_m^i$ is a memory space left when the edge server m deploys service i, $f_m^i$ represents a clock frequency of the edge server m, and $\gamma_m^i$ represents a given intention value, aiming a charge of an application provider, of deployment right competition when the edge server m deploys service i;

characterized in that an objective function of the spontaneous edge application deployment and pricing method in step 3) is:

profit $U_A^i$ obtained by the application provider in each round of service deployment:

$$U_A^i = \max_{p_m} \sum_{m \in M} p_m^i x_m^i$$  (2)

wherein,
(aa) the profit $U_A^i$ obtained by the application provider in each round of service deployment comes from expense needing to be paid to the application provider by the edge server after winning the deployment right;
where $p_m^i$ represents pricing proposed by the application provider to the edge server m obtaining the deployment right in the ith round of deployment right competition;

profit $U_i$s obtained by the edge server in each round of service deployment:

$$U_S^i = \max_{x_m, i \in N, n \in M} \left\{ (R + rs_i) \frac{x_m^i}{\sum_{k \in M} x_k^i} QoS - p_m^i x_m^i - c_m^i \right\}$$  (3)

(bb) the profit $U_i$s obtained by the edge server in each round of service deployment consists of reward available for the edge server after winning the deployment right, expense paid to the application provider by the edge server and spending of service operation of the edge server;
where R represents fixed reward earning available for the edge server after succeeding in obtaining the deployment right; $rs_i$ represents part of variable award value; r is a given variable award factor; $s_i$ is a memory size of an ith service; and $c_m^i$ is source energy consumption cost of the edge server m when deploying and operating service i, a value thereof is related to a unit memory cost of the edge server and a unit calculation cost of a CPU, and a calculation equation thereof is as follows:

$$c_m^i = a_m s_i + b_m o_{s_i}$$  (4)

$$b_m = \psi f_m$$  (5)

wherein $a_m$ represents the unit memory cost of the edge server m; $b_m$ represents the unit calculation cost of a CPU of the edge server m and is relates to a clock frequency of the edge server, and $\psi$ is a weighting coefficient; and $o_{si}$ represents a clock number consumed by operating service i;

QoS, a quality of service, is a function related to service transmission time and execution time, the lower the quality of service is, the lower the reward obtained by the edge server is, the calculation is as follows:

$$QoS = f(b_{m_{tran}}^i, b_{m_{exec}}^i)$$  (6)

wherein, $b_{m_{tran}}^i$ is a transmission time of data needed by edge server m before deploying service i; $b_{m_{exec}}^i$ is an executed time of service i on the edge server m; and f is a function for normalization processing of $b_{m_{tran}}^i$ and $b_{m_{exec}}^i$;

characterized in that a specific process for the spontaneous edge application deployment and pricing method is as follows:

1a) request stage, wherein a deployment request of any application from a user is received by the application provider;

2a) competitive stage, wherein an edge server is made to compete for the deployment right of each service of a required application, and a Nash equilibrium between a service pricing and a deployment intention value of the edge server are found on the basis of a Stackelberg game model;

3a) deployment stage, wherein the service is deployed; and 4a) repeating steps 2a)-3a) until after all services of the application are deployed.

* * * * *